(12) United States Patent
Murakami

(10) Patent No.: US 8,544,344 B2
(45) Date of Patent: Oct. 1, 2013

(54) ULTRASONIC TYPE FLOW SENSOR

(75) Inventor: Eiichi Murakami, Tokyo (JP)

(73) Assignee: Atsuden Co., Ltd., Tokyo (JP)

( * ) Notice: Subject to any disclaimer, the term of this patent is extended or adjusted under 35 U.S.C. 154(b) by 157 days.

(21) Appl. No.: 13/296,365

(22) Filed: Nov. 15, 2011

(65) Prior Publication Data
US 2013/0118272 A1 May 16, 2013

(51) Int. Cl.
*G01F 1/66* (2006.01)
(52) U.S. Cl.
USPC ...................................... 73/861.28
(58) Field of Classification Search
USPC ......................... 73/861.25–861.28
See application file for complete search history.

(56) References Cited

U.S. PATENT DOCUMENTS

| | | | | |
|---|---|---|---|---|
| 4,838,127 A | * | 6/1989 | Herremans et al. | 73/861.28 |
| 4,914,959 A | * | 4/1990 | Mylvaganam et al. | 73/861.28 |
| 5,650,571 A | * | 7/1997 | Freud et al. | 73/861.06 |
| 6,895,825 B1 | * | 5/2005 | Barkhoudarian | 73/861.28 |

FOREIGN PATENT DOCUMENTS

| | | |
|---|---|---|
| JP | 2005-192687 A | 7/2005 |
| JP | 2011-112499 A | 6/2011 |

* cited by examiner

*Primary Examiner* — Jewel V Thompson
(74) *Attorney, Agent, or Firm* — Holtz, Holtz, Goodman & Chick, PC

(57) ABSTRACT

First and second piezoelectric transducers 2 and 3 are fixed to a tubular main body 1 via first and second fitting bases 4 and 5. On front and rear surfaces of an end portion of each of the first and second piezoelectric transducers 2 and 3 are provided first and second electrodes 6 and 7. When the tubular main body 1 is secured to a circuit box, each of the end portions of the first and second piezoelectric transducers 2 and 3 is inserted between first and second contact members provided on the circuit box such that the first and second electrodes 6 and 7 are electrically connected to the first and second contact members, respectively to connect the first and second piezoelectric transducers 2 and 3 to the circuit box by one touch operation.

18 Claims, 3 Drawing Sheets

ULTRASONIC TYPE FLOW SENSOR

BACKGROUND OF THE INVENTION

1. Field of the Invention

The present invention relates to an ultrasonic type flow sensor for use in, for instance measuring a blood flow passing through an auxiliary artificial heart pump which is widely used in a cardiac surgery.

2. Related Art Statements

During a cardiac surgery, an auxialiary heart is widely utilized, and then it is required to monitor a blood flow passing through the auxialiary heart with the aid of a blood flowmeter. Such a blood flowmeter has been described in a Japanese Patent Application Laid-open Publication No. 2005-192687.

In the known ultrasonic type blood flowmeter disclosed in the above mentioned Publication, a flow sensor of the blood flowmeter includes two piezoelectric tranducers serving as an ultrasonic signal transmission and reception element, and a transmission of a signal supplied from an electrical circuit device to each of the piezoelectric tranducers as well as a transmission of a signal supplied from each of the piezoelectric tranducers to the electrical circuit device are performed by means of four lead wires each having one end soldered to the piezoelectric transducer and the other end connected to the electrical circuit device. An operation for soldering the lead wire to the piezoelectric transducer requires a time consuming labor work. Moreover, the piezoelectric transducer is liable to be damaged by heat during the soldering operation, and therefore the soldering should be conducted within a short time period at a predetermined temperature. This requires a substantial skill for the operator. Furthermore, if an excessive tensile force is applied to the lead wires, the piezoelectric transducer might be broken. Therefore, a treatment of the lead wires is rather cumbersome.

Upon the cardiac surgery, the blood flowmeter can be used only once, and after the surgery the used blood flowmeter has to be disposed together with an auxialiary artificial heart in view of infection. Contrary to this, the electrical circuit device is not subjected to the problem of infection and can be used repeatedly. Therefore, the blood flow sensor is detachably connected to the electrical circuit device. Accordingly, the blood flow sensor has to be designed so as to be easily and positively coupled with the electrical circuit device. Moreover, it is sometimes required to reduce a cost of the blood flow sensor itself.

SUMMARY OF THE INVENTION

The present invention has for its object to provide a novel and less expensive ultrasonic type flow sensor which can be connected to the electrical circuit device easily and positively without using lead wires.

According to the invention, an ultrasonic type flow sensor including a tubular main body through which a fluid whose velocity is to be measured is flown, and first and second ultrasonic signal transmission and reception elements, said first and second ultrasonic signal transmission and reception elements being arranged at side portions of said tubular main body such that first and second ultrasonic beams emitted from said first and second ultrasonic signal transmission and reception elements toward an inside of the tubular main body are received by said second and first ultrasonic signal transmission and reception elements, respectively and a difference in a propagation time period between the first and second ultrasonic beams propagating between the first and second ultrasonic signal transmission and reception elements is a measure of a velocity of the fluid flowing through the tubular main body, characterized in that each of said first and second ultrasonic signal transmission and reception elements comprises first and second electrodes provided at such positions that when said tubular main body is secured to an electrical circuit device for processing signals to be supplied to and from said first and second ultrasonic signal transmission and reception elements, said electrodes are coupled with corresponding contact members provided on the electrical circuit device.

In the ultrasonic flow sensor according to the invention, the first and second electrodes provided on the first and second ultrasonic signal transmission and reception elements can be connected to the electrical circuit device by one touch operation and it is no more necessary to connect the first and second ultrasonic signal transmission and reception elements to the electrical circuit device by soldering the lead wires. Therefore, a cumbersome labor work of an operator can be dispensed with.

In one embodiment of the ultrasonic flow sensor according to the invention, the first and second ultrasonic signal transmission and reception elements are rigidly secured to the tubular main body. Therefore, after the cardiac surgery, the tubular main body is disposed together with the first and second ultrasonic signal transmission and reception elements. In another embodiment of the ultrasonic flow sensor according to the invention, the first and second ultrasonic signal transmission and reception elements are detachably secured to the tubular main body in such a manner that the first and second ultrasonic signal transmission and reception elements are not brought into contact with a fluid flowing through the tubular main body. Therefore, after the cardiac surgery, only the tubular main body is disposed, whereas the first and second ultrasonic signal transmission and reception elements can be used repeatedly without causing any problem of infection. Then, a cost of the ultrasonic type flow sensor according to the invention can be reduced.

Figure 1:
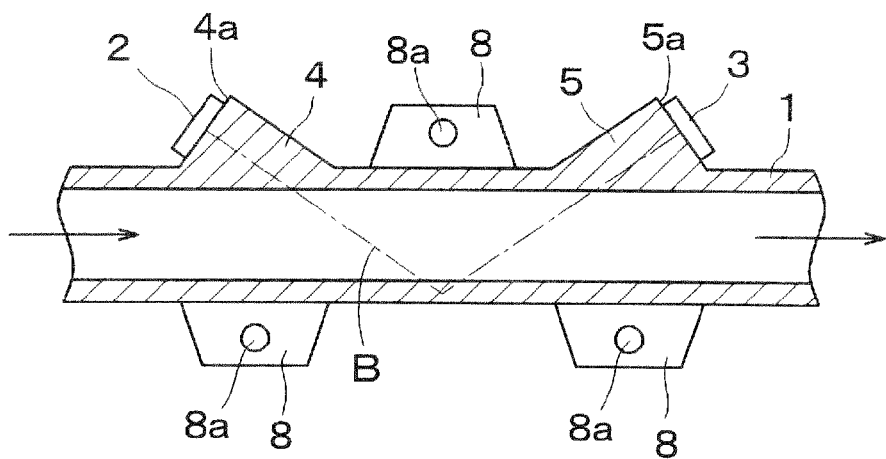
FIG. 1 is a cross sectional view showing a first embodiment of the ultrasonic type flow sensor according to the invention.

In the drawings, a reference numeral 1 denotes a tubular main body, 2, 3 first and second piezoelectric transducers, 4, 5 fitting bases, 4a, 5a end surfaces, 4b, 5b insertion holes, 6, 7 positive and negative electrodes, 8 fitting fins, 8a fitting holes, 9 a circuit box, 10 a substrate, 11, 12 slots, and 14, 15 represent first and second contact members.

DESCRIPTION OF THE PREFERRED EMBODIMENTS

Embodiment 1

Figure 2:
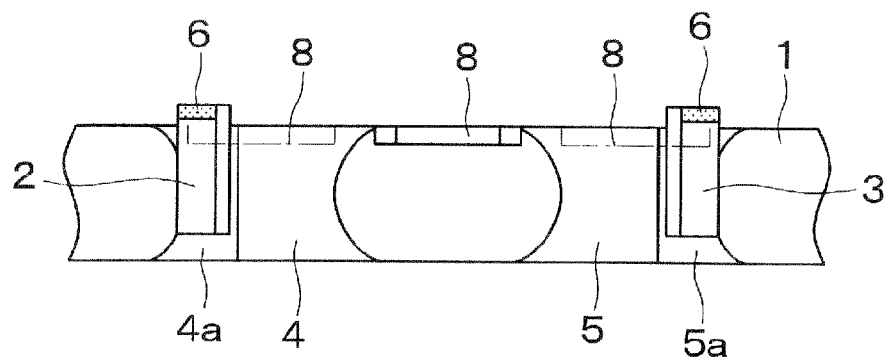
FIG. 2 is a plan view of the ultrasonic type flow sensor.

Now embodiments of the ultrasonic flow sensor according to the invention will be explained in detail with reference to the attached drawings. FIGS. 1 and 2 are a cross sectional view and a plan view, respectively showing a first embodiment of the ultrasonic type flow sensor according to the invention. The ultrasonic type flow sensor comprises a tubular main body 1 having a predetermined length. The tubular main body 1 has an inner conduit of a given diameter, and is formed by molding a transparent synthetic resin. The tubular main body 1 includes first and second fitting bases 4 and 5, and first and second piezoelectric transducers 2 and 3 each serving as an ultrasonic signal transmission and reception element are secured to end faces 4a and 5a of the first and second fitting bases 4 and 5, respectively. It should be noted that the fitting bases 4 and 5 are formed by injection molding together with the tubular main body 1.

Figure 3:
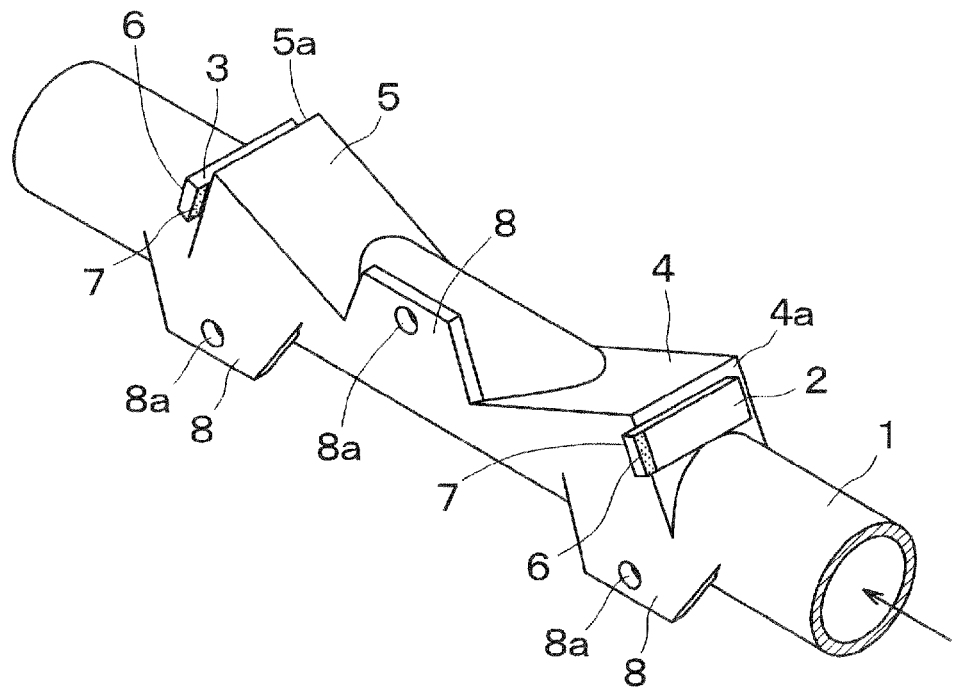
FIG. 3 is a perspective view of the ultrasonic type flow sensor.

As illustrated in FIG. 3, each of the first and second fitting bases 4 and 5 has a triangular cross section viewed on a plane passing through a longitudinal axis of the tubular main body 1. The first and second end faces 4a and 5a are inclined by about 45 degrees with respect the longitudinal axis of the tubular main body 1. The first and second piezoelectric transducers 2 and 3 have a rectangular shape and are rigidly secured to the respective end faces 4a and 5a by means of a suitable adhesive agent. As best shown in FIG. 1, the first and second piezoelectric transducers 2 and 3 are arranged such that first and second ultrasonic beams B are emitted from the first and second piezoelectric transducers 2 and 3 toward an inside of the tubular main body 1 and are reflected by an inner surface of the tubular main body 1 toward the second and first piezoelectric transducers 3 and 2, respectively. Then, a difference in a propagating time period between the first ultrasonic beam propagating from the first piezoelectric transducer 2 to the second piezoelectric transducer 3 and the second ultrasonic beam propagating from the second piezoelectric transducer 3 to the first piezoelectric transducer 2 is a measure of a velocity of a fluid flowing through the tubular main body 1.

Figure 4:
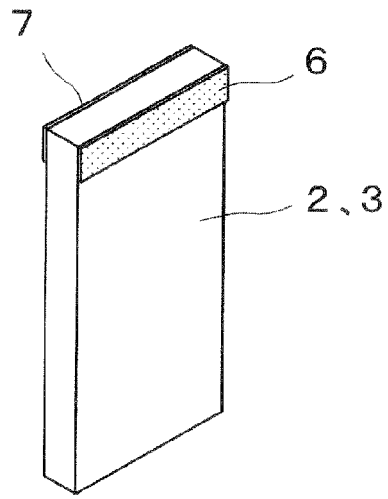
FIG. 4 is a perspective view depicting a piezoelectric transducer.

As depicted in FIG. 4, positive and negative electrodes 6 and 7 are provided on front and rear surfaces, respectively, of each of the first and second piezoelectric transducers 2 and 3. The positive and negative electrodes 6 and 7 are provided at a side edge such that when the piezoelectric transducers 2 and 3 are secured to the end faces 4a and 5a of the first and second fitting bases 4 and 5 respectively, the positive and negative electrodes 6 and 7 are extruded from the first and second fitting bases 4 and 5.

Figure 5:
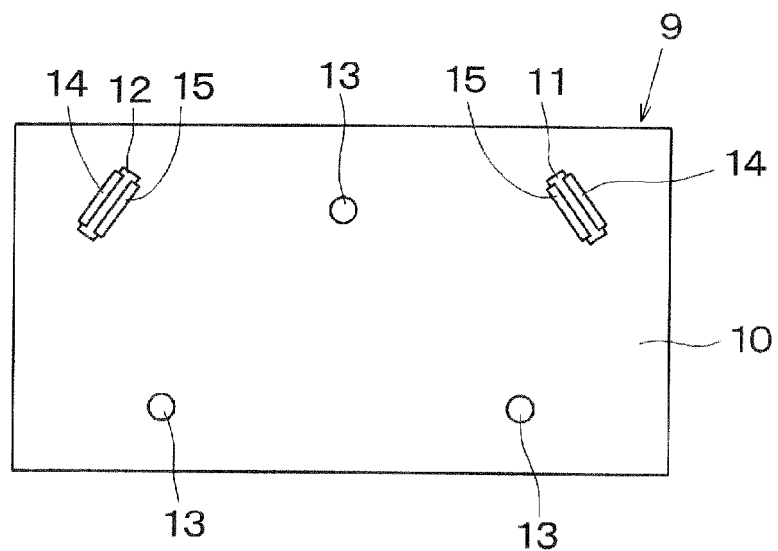
FIG. 5 is a side view showing an electrical circuit device.

The tubular main body 1 further includes three fitting fins 8 each having a fitting hole 8a. The fitting fins 8 are integrally formed with the tubular main body 1 by molding on a same side of the tubular main body extruding the positive and negative electrodes 6 and 7 of each of the first and second piezoelectric transducers 2 and 3. Upon securing the tubular main body 1 to a substrate 10 of a circuit box 9 constituting an electrical circuit device shown in FIG. 5, the tubular main body 1 is placed on the substrate 10 such that the fitting holes 8a of the fitting fins 8 are aligned with corresponding fitting holes 13 formed in the substrate 10. At the same time, the end portions of the piezoelectric transducers 2 and 3 at which the positive and negative electrodes 6 and 7 are provided are inserted into first and second slots 11 and 12 respectively formed in the substrate 10.

On a rear surface of the substrate 10 of the circuit box 9 is provided a printed circuit pattern. First and second contact members 14 and 15 are provided to extend outwardly through each of the first and second slots 11 and 12. Each of the contact members 14 and 15 is formed by an electrically conductive resilient metal such as a phosphor bronze and is secured to the substrate 10 by means of a suitable member not shown in the drawings. Remote ends of the first and second contact members are electrically connected to the electrical circuit within the circuit box 9 by soldering.

Figure 6:
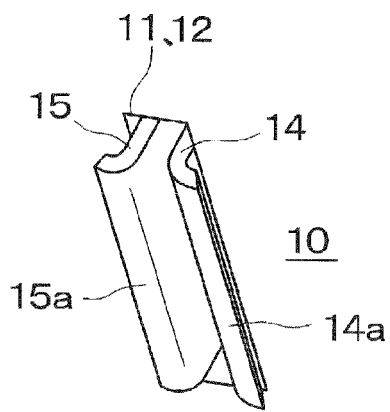
FIG. 6 is a perspective view illustrating a contact member.

As illustrated in FIG. 6, front ends 14a and 15a of the first and second contact members 14 and 15 extended outwardly from each of the first and second slots 11 and 12 are bent outwardly such that the end portions of each of the first and second piezoelectric transducers 2 and 3 at which the positive and negative electrodes 6 and 7 are provided can be easily inserted between the front ends 14a and 15a of the first and second contact members 14 and 15. By inserting the end portions of each of the first and second piezoelectric transducer 2 and 3 between the front ends 14a and 15a of the first and second contact members 14 and 15, the positive and negative electrodes 6 and 7 of each of the first and second piezoelectric transducers 2 and 3 are electrically connected to the front ends 14a and 15a of the first and second contact members 14 and 15, respectively.

The first and second piezoelectric transducers 2 and 3 produce ultrasonic vibration during the operation and this vibration is transmitted to the positive and negative electrodes 6 and 7. Therefore, if the positive and negative electrodes 6 and 7 have a fragile structure, contact condition might be degraded during the operation due to wear of the electrodes. In order to avoid such a malfunction, the positive and negative electrodes 6 and 7 have to be formed to resist the wear.

The tubular main body 1 having the piezoelectric transducers 2 and 3 secured thereto is installed in a flow circuitry including an auxiliary artificial heart pump. After the cardiac surgery, the tubular main body 1 is disposed together with the auxiliary artificial heart pump. On the other hand, the circuit box 9 including the contact members 14 and 15 is used repeatedly.

As explained above, according to the invention, upon fixing the tubular main body 1 to the circuit box 9, the positive and negative electrodes 6 and 7 of each of the first and second piezoelectric transducers 2 and 3 are coupled with the front ends 14a and 15a of the first and second contact members 14 and 15 provided at each of the first and second slots 11 and 12. Then, the positive and negative electrodes 6 and 7 of the first and second piezoelectric transducers 2 and 3 are electrically connected to the electrical circuit within the circuit box 9 via the circuit pattern of the substrate 10.

In order to fix rigidly the tubular main body 1 to the circuit box 9, screws are inserted into the fitting holes 8a of the fitting fins 8 and are screwed into the fitting holes 13 of the substrate 10. In this manner, the good electrical connection between the positive and negative electrodes 6 and 7 of the first and second piezoelectric transducers 2 and 3 and the electrical circuit within the circuit box 9 can be easily and positively attained.

After that, a blood stream caused by the auxiliary artificial heart pump is flown through the tubular main body 1 of the ultrasonic type flow sensor, and first and second ultrasonic beams are transmitted from the first and second piezoelectric transducers 2 and 3 and are received by the second and first piezoelectric transducers 3 and 2, respectively to detect a velocity of the blood flow passing through the tubular main body 1. Moreover, since the tubular main body 1 is made of a transparent synthetic resin, the operator can monitor the blood flow through the tubular main body 1 with naked eyes.

The first ultrasonic beam B emitted from the first piezoelectric transducer 2 placed at an upstream position of the blood flow passing through the tubular main body 1 propagates through the first fitting base 4 toward the inside of the conduit of the tubular main body 1 and is reflected by the inner wall of the conduit toward the second piezoelectric transducer 3. The first ultrasonic beam B propagates through the second fitting base 5 and is received by the second piezoelectric transducer 3. The second ultrasonic beam B emitted from the second piezoelectric transducer 3 propagates through the second fitting base 5, is reflected by the inner wall of the conduit of the tubular main body 1 and is received by the first piezoelectric transducer 2 through the first fitting base 4.

A propagation speed of the first ultrasonic beam B emitted from the first piezoelectric transducer 2 and received by the second ultrasonic transducer 3 is increased by the blood flow passing through the tubular main body 1 in a direction shown by an arrow in FIG. 1. Contrary to this, a propagation speed of the second ultrasonic beam B emitted from the second piezoelectric transducer 3 and received by the first piezoelectric transducer 2 is reduced by the blood flow. Therefore, there is produced a difference in a propagation time period between the first and second ultrasonic beams B and a velocity of the blood flow can be calculated from the difference in propagation time periods. Moreover, a flow rate of the blood can be calculated by multiplying the blood flow velocity by a cross sectional area of the conduit of the tubular main body 1.

After the cardiac surgery, the ultrasonic type flow sensor has to be disposed together with the auxiliary artificial heart pump. To this end, the screws are removed from the fitting holes 8a formed in the fitting fins 8 and then the first and second piezoelectric transducers 2 and 3 are pulled out of the first and second contact members 14 and 15. Therefore, the substrate 10 and contact members 14 and 15 of the circuit box 9 can be reused together with a new ultrasonic type flow sensor in a next cardiac surgery.

Embodiment 2

Figure 7:
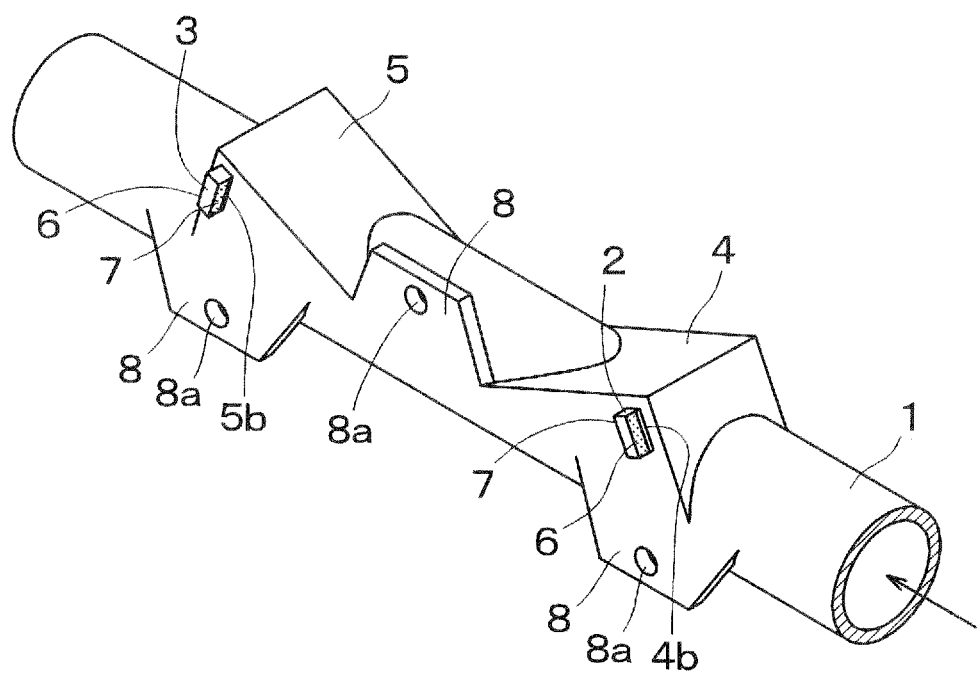
FIG. 7 is a perspective view showing a second embodiment of the ultrasonic type flow sensor according to the invention.

FIG. 7 is a perspective view showing a second embodiment of the ultrasonic type flow sensor according to the invention. In first and second fitting bases 4 and 5 there are formed first and second insertion holes 4b and 5b, respectively into which first and second piezoelectric transducers 2 and 3 are removably inserted, respectively. Each of the insertion holes 4b and 5b is formed as a blind hole and has such a structure that when the first and second piezoelectric transducers 2 and 3 are inserted into the first and second insertion holes 4b and 5b up to given positions, the first and second piezoelectric transducers 2 and 3 are placed at proper positions for transmitting and receiving the ultrasonic beams. Like as the first embodiment, positive and negative electrodes 6 and 7 formed on the first and second piezoelectric transducers 2 and 3 extrude out of the insertion holes 4b and 5b.

Suitable gel such as grease is applied on front surfaces of the first and second piezoelectric transducers 2 and 3, and therefore the front surfaces of the first and second piezoelectric transducers 2 and 3 are intimately urged against front walls of the first and second insertion holes 4b and 5b, respectively of the first and second fitting bases 4 and 5. Furthermore, elastic members such as sponge are resiliently inserted between rear surfaces of the first and second piezoelectric transducers 2 and 3 and rear walls of the first and second insertion holes 4b and 5b to further improve the contact condition of the front surfaces of the first and second piezoelectric transducers 2 and 3 with the front walls of the first and second piezoelectric elements.

The positive and negative electrodes 6 and 7 are coupled with first and second contact members 14 and 15 of a circuit box 9 in a same manner as that of the first embodiment explained above. Moreover, the tubular main body 1 is fixed to the circuit box 9 in a same manner as that of the first embodiment.

In the second embodiment, the first and second piezoelectric transducers 2 and 3 are rigidly secured to the tubular main body 1, but are removably inserted into the first and second insertion holes 4b and 5b, and therefore after the cardiac surgery, the first and second piezoelectric transducers 2 and 3 are removed from the tubular main body and can be used repeatedly, although the tubular main body should be disposed.

The present invention is not limited to the embodiment so far explained above, but any alternations and modifications can be conceived by a person skilled in the art within the scope of the invention as claimed in claims. For instance, in the above embodiments, the first and second fitting bases 4 and 5 are formed by the injection molding together with the tubular main body 1, but according to the invention the first and second fitting bases 4 and 5 may be formed separately from the tubular main body 1 and may be secured to the tubular main body by means of an adhesive agent. Furthermore, in the above embodiments, the first and second electrodes 6 and 7 are formed on the front and rear surfaces of the piezoelectric element, but according to the invention, the positive and negative electrodes 6 and 7 may be formed on one of the front and rear surfaces of the piezoelectric element. In this case, the first and second contact members 14 and 15 should be modified accordingly.

In the above embodiments 1 and 2, the tubular main body 1 is formed by a straight tube and the first and second piezoelectric transducers 2 and 3 are arranged on side portions of the tubular main body 1, but according to the invention, the tubular main body 1 may be formed to have a crank configuration including a straight tube portion, an inlet tube portion and an outlet tub portion, said inlet and outlet tube portions being coupled with the straight tube perpendicularly thereto near respective ends of the straight tube portion. Then, the first and second piezoelectric transducers 2 and 3 may be provided at respective end faces of the straight tube portion.

What is claimed is:

1. An ultrasonic type flow sensor comprising:
   a tubular main body through which a fluid whose velocity is to be measured is flown, and
   first and second ultrasonic signal transmission and reception elements arranged at an upstream position and a downstream position, respectively of the tubular main body viewed in a flowing direction of the fluid such that first and second ultrasonic beams emitted from said first and second ultrasonic signal transmission and reception elements toward an inside of the tubular main body are received by said second and first ultrasonic signal transmission and reception elements, respectively and a difference in a propagation time period between the first and second ultrasonic beams propagating between the first and second ultrasonic signal transmission and reception elements is a measure of a velocity of the fluid flowing through the tubular main body,
   wherein each of said first and second ultrasonic signal transmission and reception elements comprises first and second electrodes provided at such positions that when said tubular main body is secured to an electrical circuit device for processing signals to be supplied to and from said first and second ultrasonic signal transmission and reception elements, said first and second electrodes are coupled with corresponding first and second contact members provided on the electrical circuit device.

2. The ultrasonic type flow sensor according to claim 1, wherein the tubular main body further includes fitting fins for securing the tubular main body to the electrical circuit device, and said first and second electrodes are coupled with the first and second contact members by securing firmly the fitting fins of the tubular main body to the electrical circuit device.

3. The ultrasonic type flow sensor according to claim 1, wherein said first and second electrodes are provided on front and rear surfaces, respectively of an end portion of each of the first and second ultrasonic signal transmission and reception elements and said first and second contact members are formed by first and second resilient metal strips, respectively, said first and second electrodes being resiliently urged against the first and second contact members, respectively when the end portions of the first and second ultrasonic signal transmission and reception elements are inserted between said first and second contact members.

4. The ultrasonic type flow sensor according to claim 1, wherein said tubular main body comprises first and second fitting bases and said first and second ultrasonic signal transmission and reception elements, respectively are firmly fixed to said first and second fitting bases, respectively, whereby said tubular main body, first and second ultrasonic signal transmission and reception elements and first and second electrodes are disposed as an integral body after the ultrasonic type flow sensor is used only once.

5. The ultrasonic type flow sensor according to claim 4, wherein said first and second fitting bases are formed integrally with the tubular member by injection molding.

6. The ultrasonic type flow sensor according to claim 4, wherein said first and second fitting bases are formed as independent members separate from the tubular main body and are firmly secured to the tubular main body.

7. The ultrasonic type flow sensor according to claim 1, wherein said tubular main body includes first and second fitting bases and said first and second ultrasonic signal transmission and reception elements are removably inserted into first and second insertion holes formed in first and second fitting bases, respectively whereby said tubular main body and first and second fitting bases are disposed after the ultrasonic type flow sensor is used only once, but said ultrasonic signal transmission and reception elements and first and second electrodes are repeatedly used.

8. The ultrasonic type flow sensor according to claim 7, wherein said first and second fitting bases are formed integrally with the tubular member by injection molding.

9. The ultrasonic type flow sensor according to claim 7, wherein said first and second fitting bases are formed as independent members separate from the tubular main body and are firmly secured to the tubular main body.

10. The ultrasonic type flow sensor according to claim 1, wherein each of said first and second ultrasonic signal transmission and reception elements comprises a piezoelectric element.

11. The ultrasonic type flow sensor according to claim 2, wherein each of said first and second ultrasonic signal transmission and reception elements comprises a piezoelectric element.

12. The ultrasonic type flow sensor according to claim 3, wherein each of said first and second ultrasonic signal transmission and reception elements comprises a piezoelectric element.

13. The ultrasonic type flow sensor according to claim 4, wherein each of said first and second ultrasonic signal transmission and reception elements comprises a piezoelectric element.

14. The ultrasonic type flow sensor according to claim 5, wherein each of said first and second ultrasonic signal transmission and reception elements comprises a piezoelectric element.

15. The ultrasonic type flow sensor according to claim 6, wherein each of said first and second ultrasonic signal transmission and reception elements comprises a piezoelectric element.

16. The ultrasonic type flow sensor according to claim 7, wherein each of said first and second ultrasonic signal transmission and reception elements comprises a piezoelectric element.

17. The ultrasonic type flow sensor according to claim 8, wherein each of said first and second ultrasonic signal transmission and reception elements comprises a piezoelectric element.

18. The ultrasonic type flow sensor according to claim 9, wherein each of said first and second ultrasonic signal transmission and reception elements comprises a piezoelectric element.

* * * * *